United States Patent
Arkenau

(10) Patent No.: US 11,707,060 B2
(45) Date of Patent: Jul. 25, 2023

(54) MOBILE BLIND

(71) Applicant: Edward Clifford Arkenau, Fortville, IN (US)

(72) Inventor: Edward Clifford Arkenau, Fortville, IN (US)

( * ) Notice: Subject to any disclaimer, the term of this patent is extended or adjusted under 35 U.S.C. 154(b) by 0 days.

(21) Appl. No.: 17/346,102

(22) Filed: Jun. 11, 2021

(65) Prior Publication Data

US 2021/0386054 A1     Dec. 16, 2021

Related U.S. Application Data

(60) Provisional application No. 63/037,929, filed on Jun. 11, 2020.

(51) Int. Cl.
    *A01M 31/02*     (2006.01)
    *E04H 15/00*     (2006.01)
    *E04H 15/44*     (2006.01)

(52) U.S. Cl.
    CPC .......... *A01M 31/025* (2013.01); *E04H 15/001* (2013.01); *E04H 15/44* (2013.01)

(58) Field of Classification Search
    CPC ... E04H 15/005; E04H 15/001; A01M 31/025
    See application file for complete search history.

(56) References Cited

U.S. PATENT DOCUMENTS

| | | | | |
|---|---|---|---|---|
| 3,537,688 A | * | 11/1970 | Stein ...................... | E04H 15/003 47/29.6 |
| 3,690,334 A | * | 9/1972 | Miller ................. | A01M 31/025 D25/16 |
| 4,723,371 A | | 2/1988 | Williams | |
| 5,613,512 A | * | 3/1997 | Bean ................... | A01M 31/025 135/117 |
| 7,735,503 B2 | * | 6/2010 | Jenkinson ............. | E04H 15/001 135/96 |
| 7,802,582 B2 | | 9/2010 | Livacich et al. | |
| 8,863,765 B2 | * | 10/2014 | Heilman ............. | A01M 31/025 135/96 |
| 9,072,290 B1 | | 7/2015 | McCauley | |
| 9,271,416 B2 | * | 2/2016 | Carpenter ................ | H05K 5/03 |
| D784,800 S | * | 4/2017 | Burchfield ................... | D8/396 |
| 10,165,770 B2 | * | 1/2019 | Burchfield ............ | E04H 15/001 |
| 2012/0012142 A1 | * | 1/2012 | Frady ..................... | E04H 15/06 135/96 |
| 2013/0008617 A1 | * | 1/2013 | Rivera ................ | G09F 15/0025 160/127 |
| 2017/0096833 A1 | * | 4/2017 | Colbeck .................. | E04H 15/54 |
| 2020/0024862 A1 | * | 1/2020 | Bianchi ................... | E01F 7/025 |

OTHER PUBLICATIONS

Zhejian Zhongnan Group Hunting Camo Manufacturing Co., Ltd, Telescoping Ground Blind, ghillieleafsuit.com, Jun. 2021.
Primos, Double Bull Surroundview Stakeout Hunting Blind, primos.com, Mar. 18, 2019.

* cited by examiner

*Primary Examiner* — David R Dunn
*Assistant Examiner* — Danielle Jackson

(57) ABSTRACT

A mobile blinds apparatus that installs along a raised platform for hunting is presented. The mobile blinds apparatus contains at least one rod, at least one blinds sheet, and at least one blinds anchor. Each of the at least one rod contains a mounting end. The mounting end is terminally positioned adjacent to the at least one rod. Each of the at least one blinds sheet traverses along each of the at least one rod. Each of the at least one blinds anchor is connected adjacent to the mounting end.

5 Claims, 6 Drawing Sheets

MOBILE BLIND

The current application claims a priority to the U.S. Provisional Patent application Ser. No. 63/037,929 filed on Jun. 11, 2020.

FIELD OF THE INVENTION

The present invention generally relates to blinds. More specifically, the present invention relates to hunting blinds that hide the user when hunting.

BACKGROUND OF THE INVENTION

Devices used to conceal hunters from prey are necessary for a successful hunt. Many times, hunters have difficulty finding a good tree to hide themselves when hunting. Hunters hiding among immature trees or bare aspens can spook animals, driving them from the area. Large, gnarly trees can help reduce a hunter's profile, or hunters can use camouflaged burlap to hide themselves, but hiding movement is difficult. As a result, hunters must remain camouflaged and nearly motionless for long periods, positioned for an effective shot when the opportunity arises.

Hunters can use various hunting structures to hide themselves, but mobility can be an issue when a hunter needs to move so as to follow an animal. A hunter may hide in a tent, but tents are generally designed to form a completely closed structure with a unitary top and floor. Accordingly, tents are not generally usable as hunting blinds.

Blinds offer ease of movement and of entry and exit, so that hunters can slip in and out without scaring away nearby animals. In a blind, hunters may eat a quick snack or lift their binoculars with less chance of scaring away their prey than in the open field. Companies have developed various blinds for hunting, but they are generally made bulky and heavy to provide the strength needed to retain their shape and form a stable structure.

As a result, there is a need for a portable hunting blind that is light while effectively concealing hunters. The present invention is intended to address problems associated with and/or otherwise improve on conventional devices through an innovative blind device that is designed to be portable and provide a convenient means of hiding hunters while incorporating other problem-solving features.

SUMMARY OF THE INVENTION

The present invention is a mobile blind apparatus that installs along a raised platform for hunting. The mobile blind apparatus comprises at least one rod, at least one blind sheet, and at least one blind anchor. Each of the at least one rod comprises a mounting end. The mounting end is terminally positioned adjacent to the at least one rod. Each of the at least one blind sheet traverses along each of the at least one rod. Each of the at least one blind anchor is connected adjacent to the mounting end.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
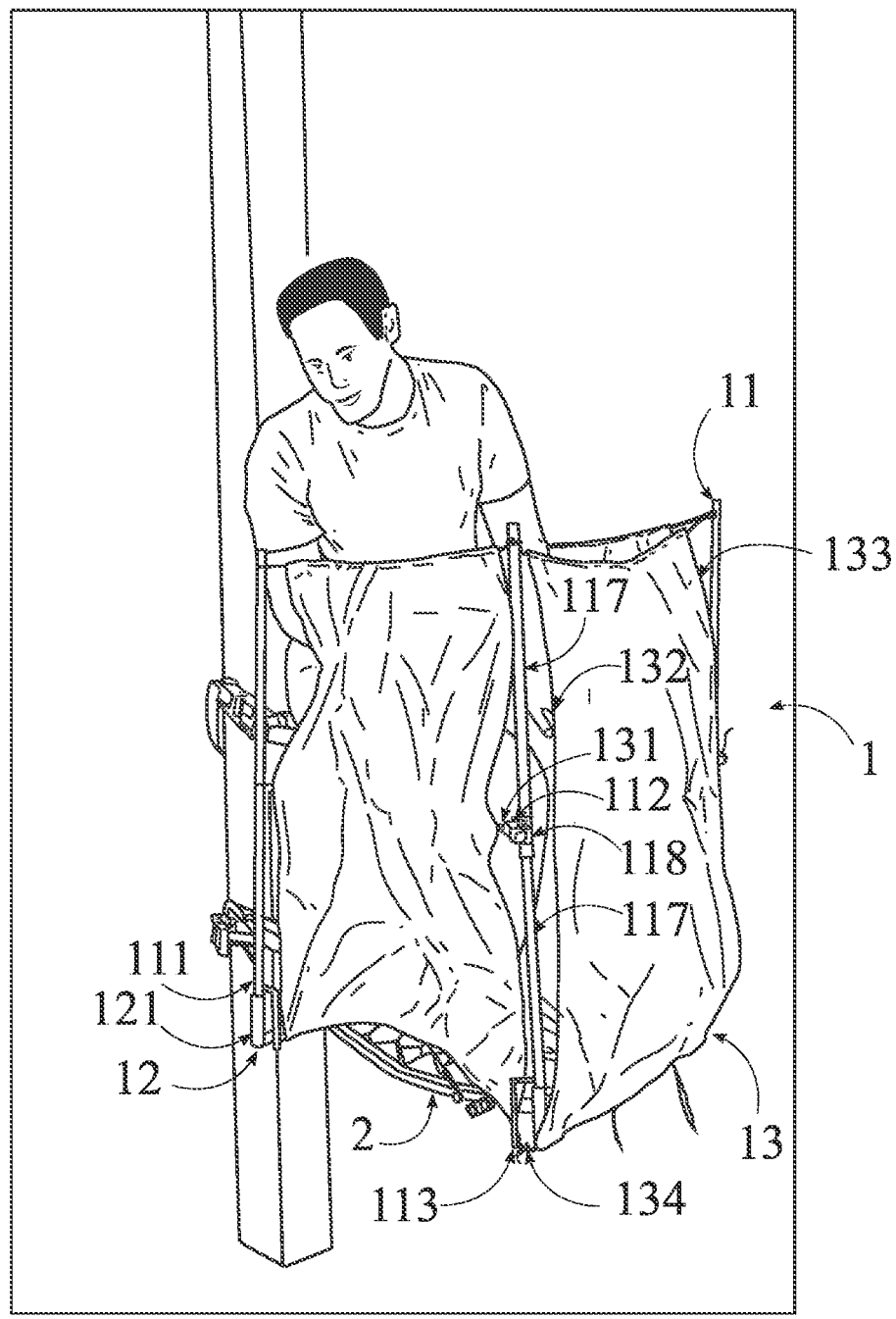
FIG. 1 is an illustration showing the present invention in a deployed configuration.

In reference to FIG. 1, the present invention is a mobile blind apparatus 1 that installs along a raised platform 2 in a deployed configuration. In reference to FIGS. 1-3, the mobile blind apparatus 1 comprises at least one rod 11, at least one blind sheet 13, and at least one blind anchor 12. Each of the at least one rod 11 comprises a mounting end 111. The mounting end 111 is terminally positioned adjacent to the at least one rod 11. Each of the at least one blind sheet 13 traverses along each of the at least one rod 11. Each of the at least one blind anchor 12 is connected adjacent to the mounting end 111. In the preferred embodiment of the present invention, the mobile blind apparatus 1 is easily deployed from its compact configuration and installed along the raised platform 2 through the use of the at least one blind anchor 12. In the preferred embodiment of the present invention, the at least one blind anchor 12 may take the form of any suitable anchoring element such as, but not limited to: C-clamp mounts, vice clamps, or any other suitable anchoring element that connects the mobile blind apparatus 1 along the raised platform 2. In the preferred embodiment of the present invention, the anchoring element is made out of a durable material, such as, but not limited to steel, aluminum or any other suitable material. In another embodiment, the at least one blind anchor 12 may take the form of ground stakes that allows the user to anchor the mobile blind along the ground. In the preferred embodiment of the present invention, the at least one rod 11 may take the form of structural posts that supports the at least one blind sheet 13 along the raised platform 2. In the preferred embodiment of the present invention, the at least one rod 11 is made out of any durable and lightweight material, such as, but not limited to fiberglass, aluminum, carbon fiber, or any other suitable material. In the preferred embodiment of the present invention, the at least one blind sheet 13 may take the form of a section of blinds that covers the perimeter of the raised platform 2 such that the at least one blind sheet 13 conceals the user along the raised platform 2.

Figure 2:
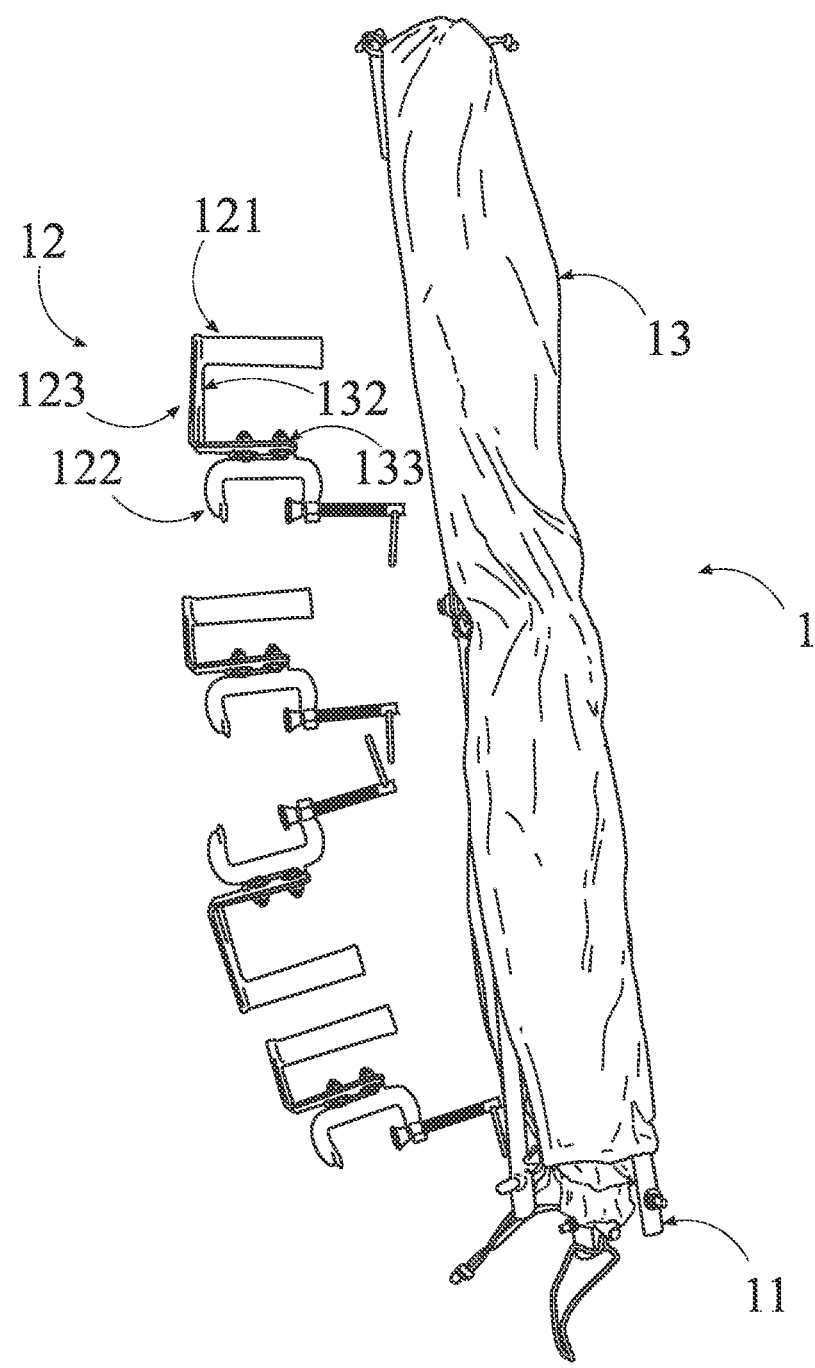
FIG. 2 is an illustration showing the present invention in a compact configuration.
Figure 3:
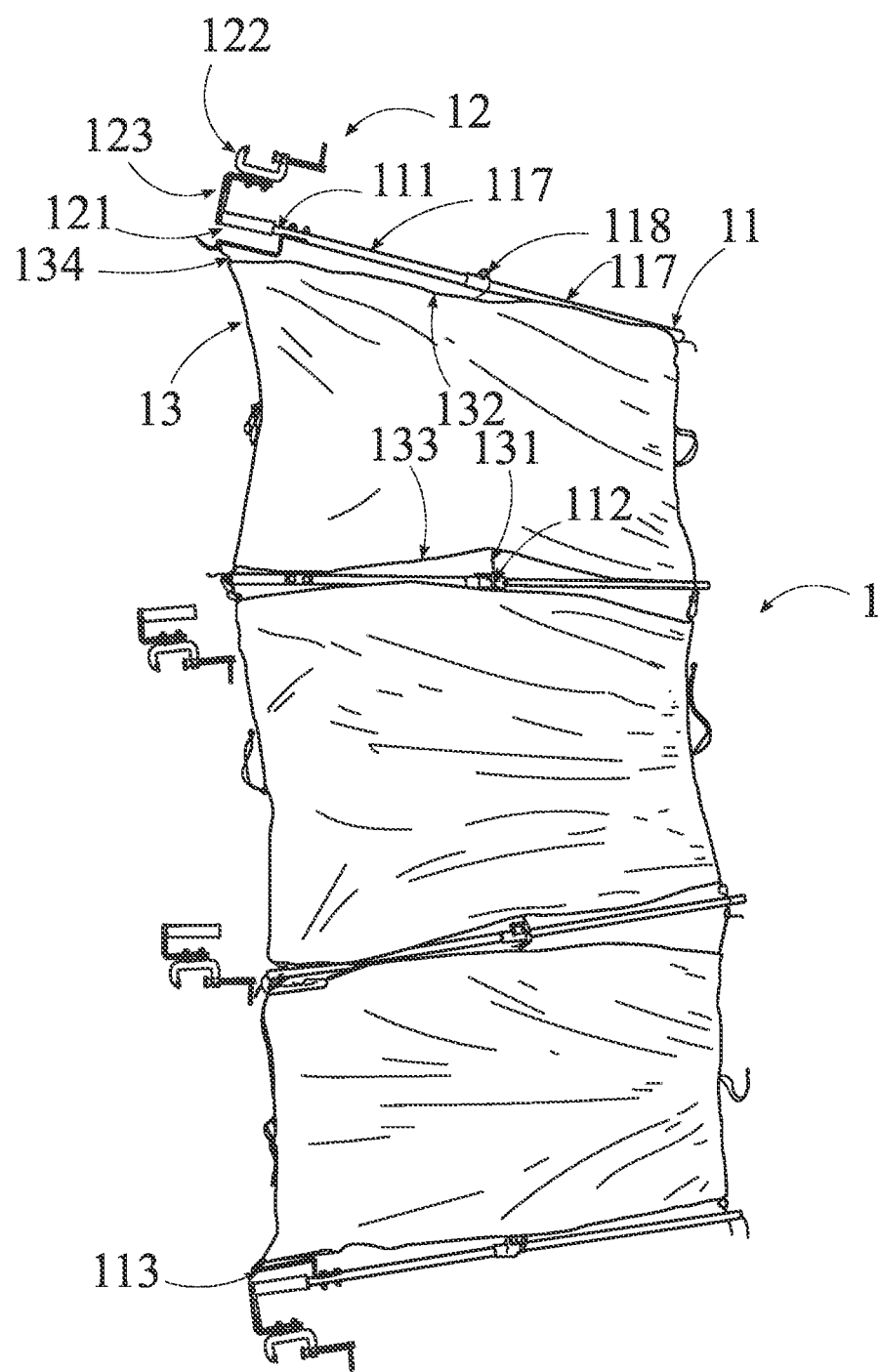
FIG. 3 is an illustration showing the present invention spread out.
Figure 6:
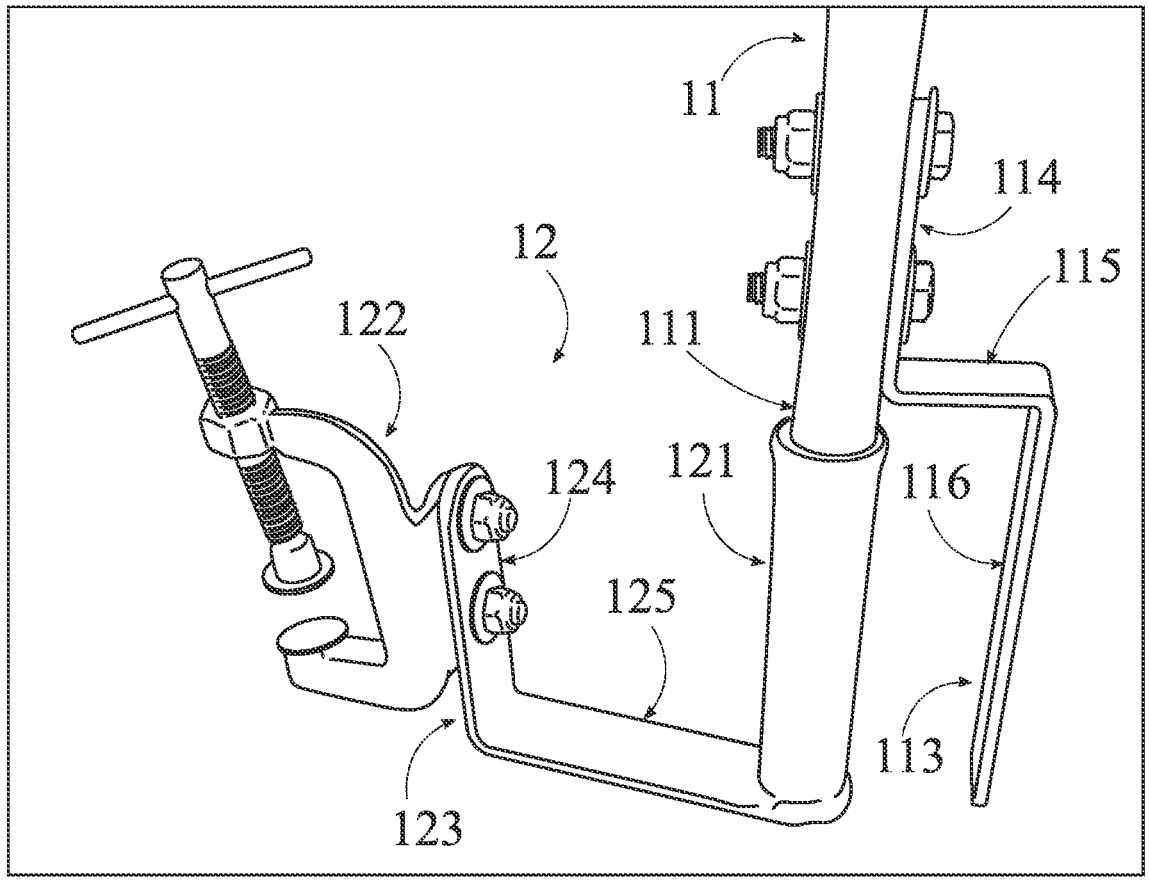
FIG. 6 is an illustration showing a blind anchor.

In reference to FIGS. 2-3 and 6, each of the at least one blind anchor 12 comprises a rod receiver 121 and a connection element 122. The connection element 122 is connected adjacent to the rod receiver 121. The mounting end 111 is removably connected to the rod receiver 121. In the preferred embodiment of the present invention, the rod receiver 121 allows the mounting end 111 of the at least one rod 11 to install and secure along the at least one blind anchor 12. In the preferred embodiment of the present invention, the connection element 122 may take the form of a c-clamp that allows the at least one blind anchor 12 to removably attach to the raised platform 2. In reference to FIGS. 2-3 and 6, each of the at least one blind anchor 12 further comprises a spacer element 123. The spacer element 123 is connected between the rod receiver 121 and the connection element 122, where the spacer element 123 is configured to space apart the rod receiver 121 and the connection element 122. The spacer element 123 further comprises a first flange 124 and a second flange 125. The first flange 124 is connected adjacent to the connection element 122. The second flange 125 is perpendicularly connected to the first flange 124 and. The rod receiver 121 is vertically connected to the second flange 125. In the preferred embodiment of the present invention, the spacer element 123 may take the form of an L bracket that spaces the connection element 122 from the rod receiver 121 to facilitate sufficient clearance of the mobile blind apparatus 1 along the raised platform 2.

Figure 4:
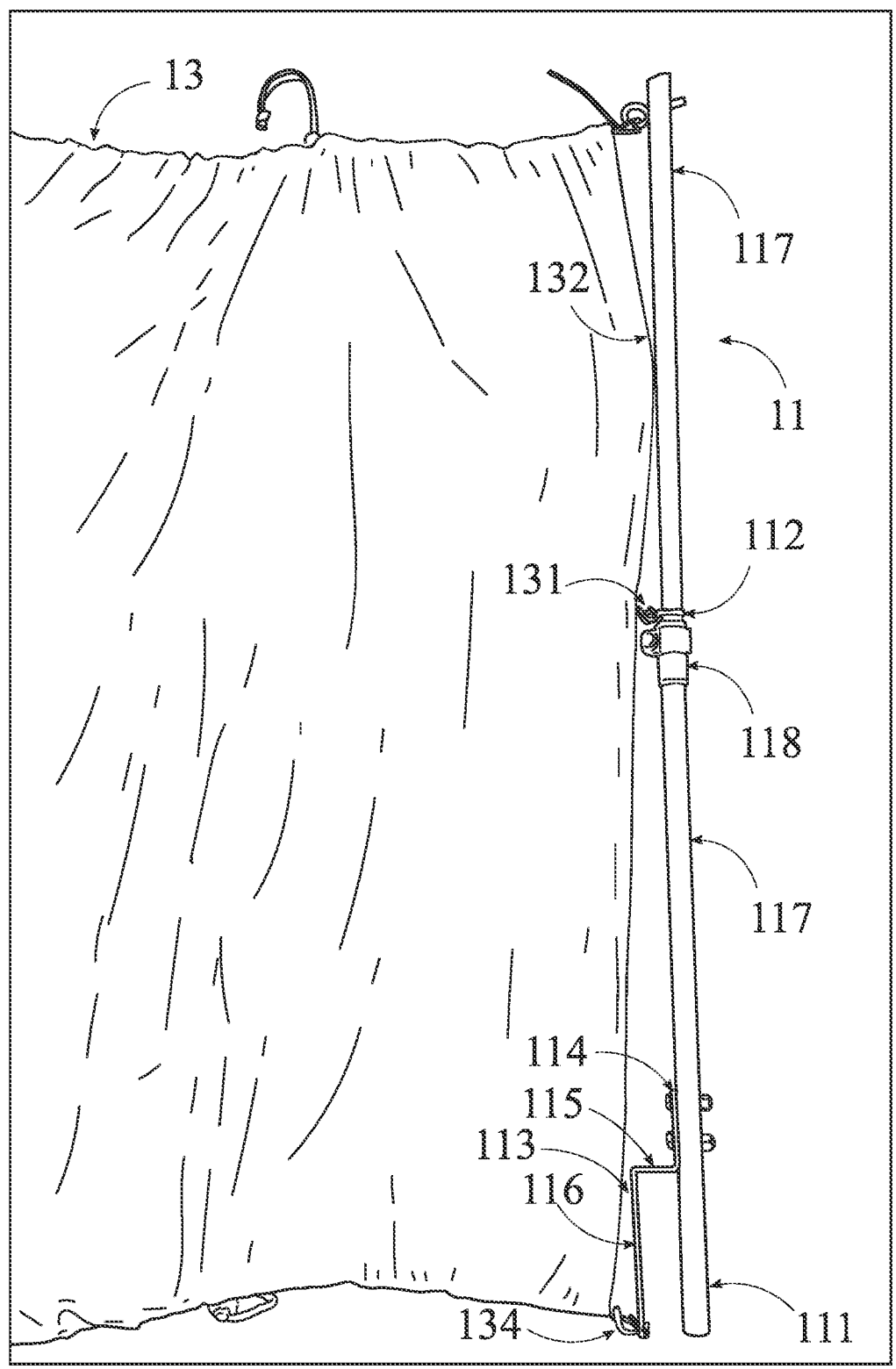
FIG. 4 is an illustration showing a rod.
Figure 5:
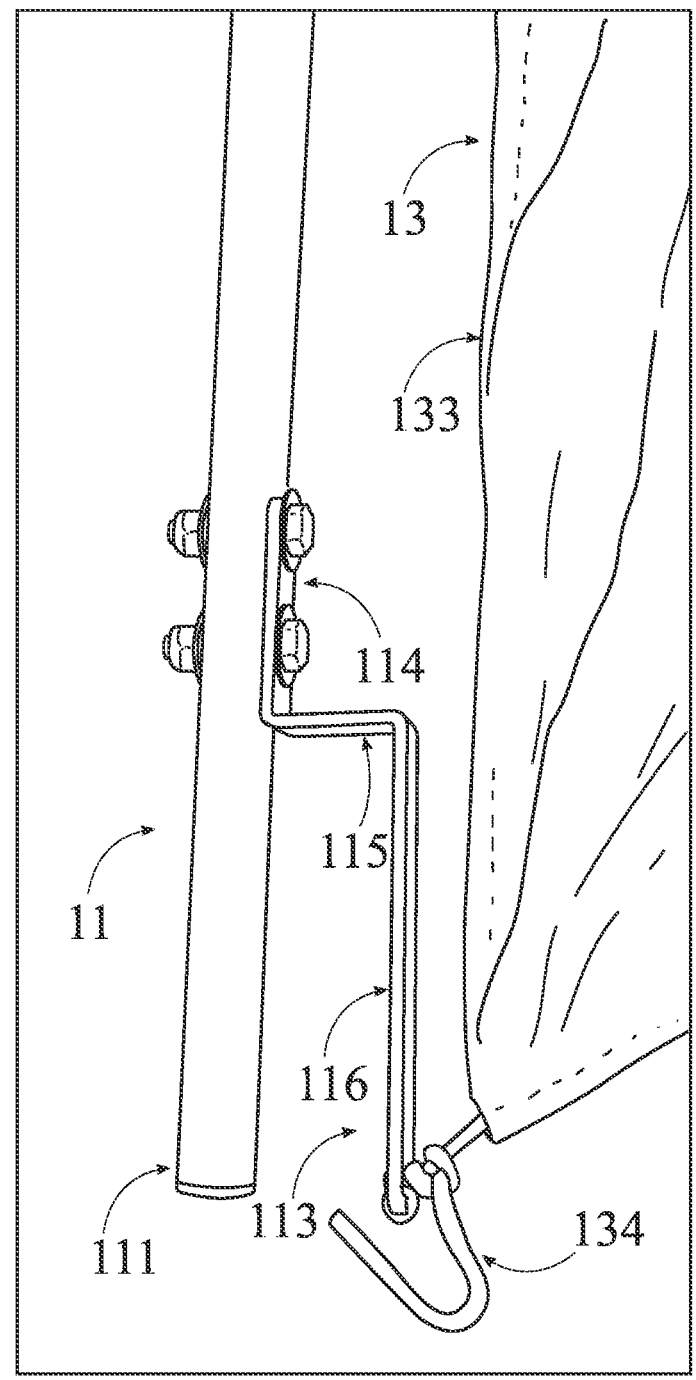
FIG. 5 is an illustration showing a mounting end.

In reference to FIGS. 1, 3, and 4, each of the at least one rod 11 comprises at least one mounting element 112. Each of the at least one blind sheet 13 comprises at least one connecting element 131, a first side 132, and a second side 133. The at least one mounting element 112 is distributed about the at least one rod 11. The first side 132 and the second side 133 is positioned terminally opposite to each other along the at least one blind. The at least one connecting element 131 is distributed about the first side 132 and the second side 133. Each of the at least one connecting element 131 is connected to each of the at least one mounting element 112, where the at least one connecting element 131 is configured to attach one of the at least one rod 11 on the first side 132 and the second side 133 of the at least one blind sheet 13. In the preferred embodiment of the present invention, the at least one mounting element 112 may take the form of mounting points positioned along the at least one rod 11 such that the at least one blind is installed along the rod when paired in conjunction with the at least one connecting element 131. In the preferred embodiment of the present invention, the at least one mounting element 112 may take the form of cord loops but may take the form of any other suitable mounting element. In the preferred embodiment of the present invention, the at least one connecting element 131 may take the form of cord ties but may take the form of any other suitable connecting element.

In reference to FIGS. 1 and 3-6, each of the at least one rod 11 comprises an overhang mount 113. Additionally, each of the at least one blind sheet 13 further comprises a base connector 134. The overhang mount 113 is connected adjacent to the mounting end 111, where the overhang mount 113 is configured to traverse over the at least one blind anchor 12. The base connector 134 is connected adjacent to the first side 132 and the second side 133. The base connector 134 is connected to the overhang mount 113. In the preferred embodiment of the present invention, the overhang mount 113 provides another mounting point that allows the at least one blind sheet 13 to traverse past the at least one blind anchor 12, concealing the at least one blind anchor 12. The overhang mount 113 comprises a mounting flange 114, a spacer flange 115, and an overhang flange 116. The mounting flange 114 is connected adjacent to the mounting end 111. The first spacer flange 115 is perpendicularly connected to the mounting flange 114. The overhang flange 116 is perpendicularly connected to the spacer flange 115, opposite and parallel to the mounting flange 114. The base connector 134 is connected to the overhang flange 116, where the overhang flange 116 is configured to traverse over the at least one blind anchor 12. In the preferred embodiment of the present invention, each of the at least one rod 11 further comprises a plurality of telescoping sections 117 and an adjustment element 118, as shown in FIGS. 1 and 3-4. The plurality of telescoping sections 117 is slidably connected to each other through the adjustment element 118, where the plurality of sections is configured to adjust in length through the adjustment element 118. This allows the at least one rod 11 to retract into a compact configuration.

Although the invention has been explained in relation to its preferred embodiment, it is to be understood that many other possible modifications and variations can be made without departing from the spirit and scope of the invention as hereinafter claimed.

What is claimed is:

1. A mobile blind apparatus comprising:
   at least one rod;
   at least one blind sheet;
   at least one blind anchor;
   each of the at least one rod comprising a mounting end;
   the mounting end being terminally positioned on an end of the at least one rod;
   each of the at least one blind sheet traversing along each of the at least one rod;
   each of the at least one blind anchor being connected adjacent to the mounting end;
   each of the at least one blind anchor comprising a rod receiver and a connection element;
   the connection element being connected adjacent to the rod receiver;
   the mounting end being removably connected to the rod receiver;
   the connection element being a c-clamp;
   each of the at least one blind anchor further comprising a spacer element;
   the spacer element being connected between the rod receiver and the connection element, wherein the spacer element is configured to space apart the rod receiver and the connection element;
   the spacer element further comprising a first flange and a second flange;
   the first flange being connected adjacent to the connection element;
   the second flange being perpendicularly connected to the first flange; and
   the rod receiver being vertically connected to the second flange.

2. The mobile blind apparatus as claimed in claim 1, wherein
   each of the at least one rod comprising at least one mounting element;
   each of the at least one blind sheet comprising a first connecting element, a second connecting element, a first side, and a second side;
   the at least one mounting element being arranged on the at least one rod;
   the first side and the second side being positioned terminally opposite to each other along the at least one blind sheet;
   the first connecting element being arranged on the first side, and the second connecting element being arranged on the second side; and
   each of the connecting elements being connected to one of the at least one mounting element.

3. The mobile blind apparatus as claimed in claim 2, wherein each of the at least one rod comprising an overhang mount;

each of the at least one blind sheet comprising a base connector;

the overhang mount being connected adjacent to the mounting end, wherein the overhang mount is configured to traverse over one of the at least one blind anchor; and the base connector being connected to the overhang mount.

4. The mobile blind apparatus as claimed in claim 3, wherein the overhang mount comprising a mounting flange, a spacer flange, and an overhang flange;

the mounting flange being connected adjacent to the mounting end;

the first spacer flange being perpendicularly connected to the mounting flange;

the overhang flange being perpendicularly connected to the spacer flange, opposite and parallel to the mounting flange; and the base connector being connected to the overhang flange, wherein the overhang flange is configured to traverse over the at least one blind anchor.

5. The mobile blind apparatus as claimed in claim 1, wherein each of the at least one rod further comprising a plurality of telescoping sections and an adjustment element; and the plurality of sections being slidably connected to each other through the adjustment element, wherein the plurality of sections is configured to adjust in length through the adjustment element.

\* \* \* \* \*